No. 692,342. Patented Feb. 4, 1902.
G. H. POUNDER.
HARROW.
(Application filed Apr. 29, 1901.)
(No Model.) 2 Sheets—Sheet I.
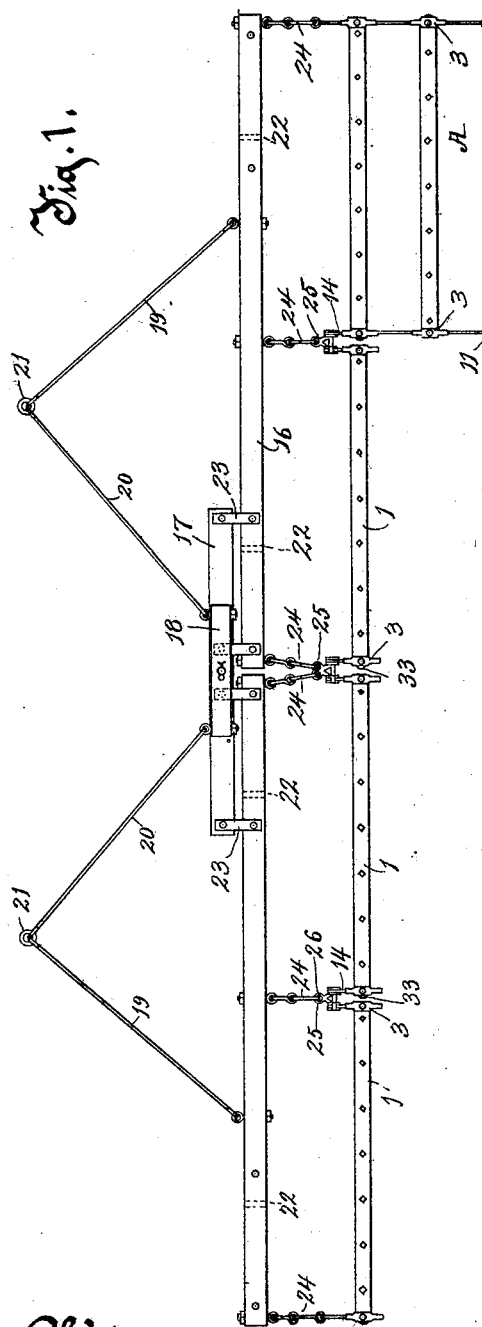
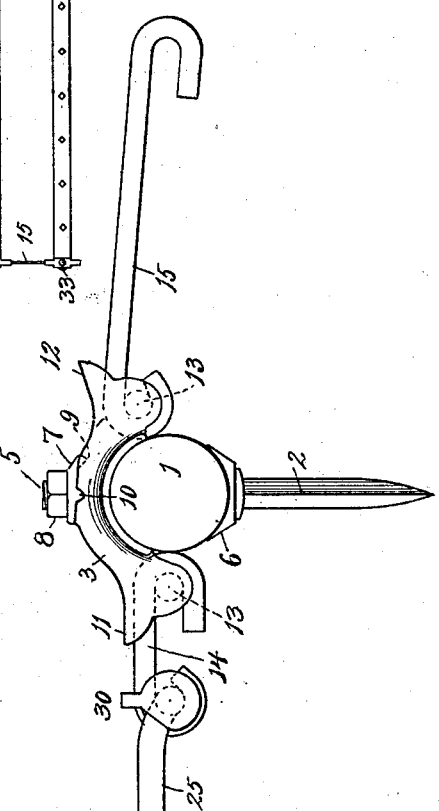
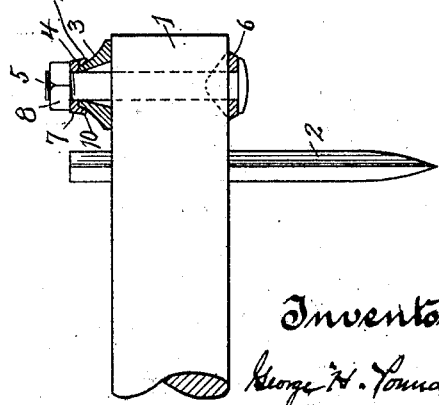
Witnesses.
C. H. Keeney,
Anna V. Faust.
Inventor.
George H. Pounder
By Benedict Morsell
Attorneys.

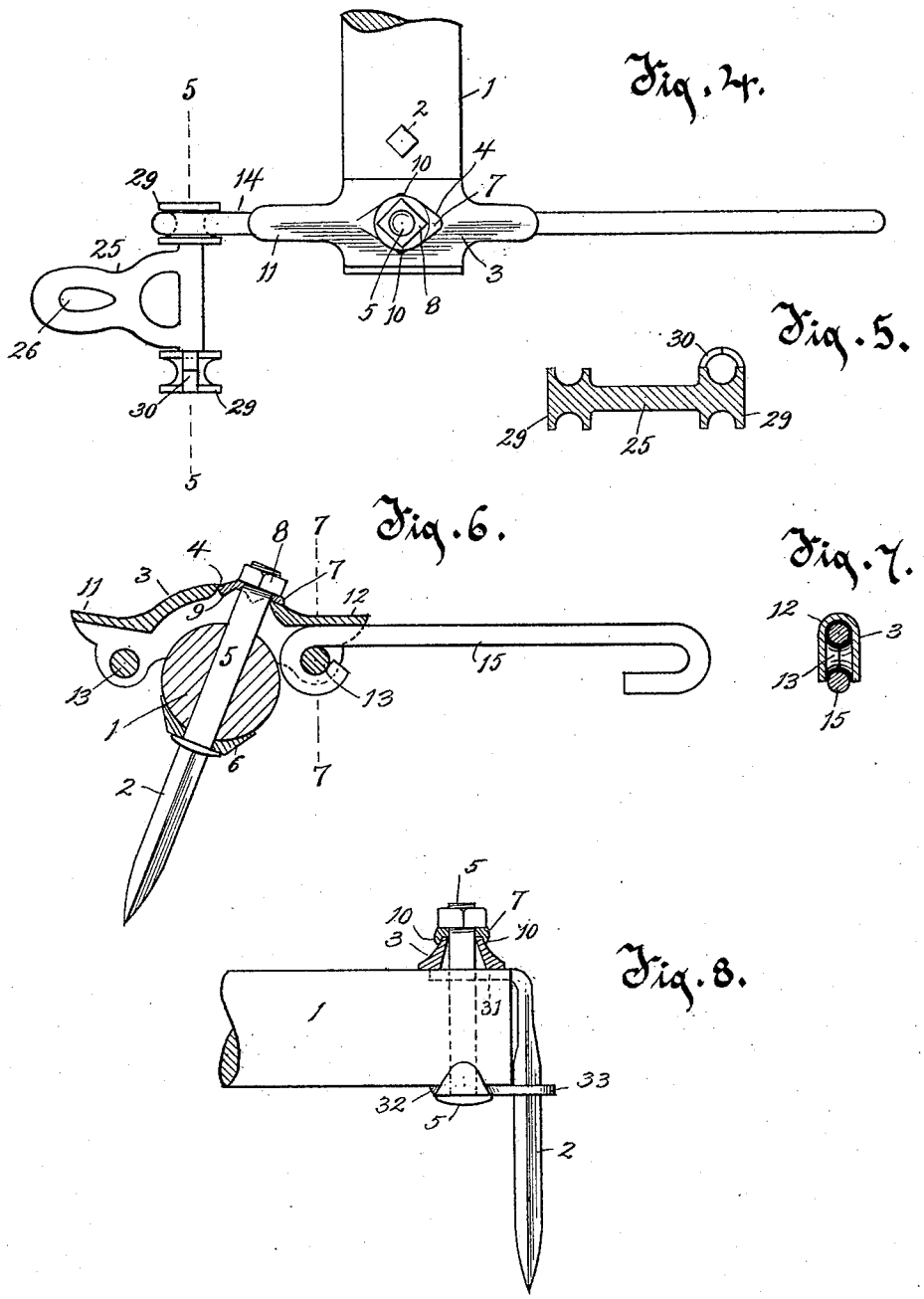

UNITED STATES PATENT OFFICE.

GEORGE H. POUNDER, OF FORT ATKINSON, WISCONSIN.

HARROW.

SPECIFICATION forming part of Letters Patent No. 692,342, dated February 4, 1902.

Application filed April 29, 1901. Serial No. 57,894. (No model.)

*To all whom it may concern:*

Be it known that I, GEORGE H. POUNDER, residing at Fort Atkinson, in the county of Jefferson and State of Wisconsin, have invented a new and useful Improvement in Harrows, of which the following is a description, reference being had to the accompanying drawings, which are a part of this specification.

My invention relates to improvements in the details of the construction of a harrow whereby a maximum of strength is obtained with a minimum of weight of parts, a desired flexibility of the harrow is secured, a capability of adjustment of the parts, especially of the teeth, and of holding them in the adjusted positions are provided for, and other minor benefits are accomplished. These improvements also include such adaptation of the parts for their purposes as combines capability of application and combination or separation of the members with desired strength and endurance.

The invention consists of the improvements hereinafter described and claimed or the equivalents thereof.

In the drawings, Figure 1 is a top plan view of my improved harrow, the drawing being intended to illustrate a harrow consisting of four sections, only one of which sections, however, is shown, the other three being omitted, except a fragment thereof, in connection with members of the construction adapted for connecting together and hauling the four sections of the harrow or when desired for coupling up or combining a less number of sections and hauling them. Fig. 2 is an end view of one rail of a section of the harrow with related parts, illustrating the means for connecting the rails to each other, for securing the teeth of the harrow in predetermined position, and for hauling the harrow along. Fig. 3 shows a fragment of a rail of the harrow with rail adjusting and securing devices, partly in section. Fig. 4 is a top plan view of the parts shown in elevation in Fig. 2. Fig. 5 is a section on line 5 5 of Fig. 4. Fig. 6 is a section of some of the parts shown in elevation in Fig. 2 with the tooth of the harrow in inclined position and showing the means by which this inclined position is obtained and held. Fig. 7 is a section on line 7 7 of Fig. 6. Fig. 8 shows a fragment of a harrow-rail with a form of harrow-tooth employed at the end of a rail and the means for securing it in place.

Harrows at the present day are commonly constructed so as to be adapted to be used singly or in combination, and my improved harrow consists of a section A or of a plurality of such sections coupled together and provided with means whereby the combined harrow can be readily hitched onto by the eveners or whiffletrees for one or more teams for hauling it along. In Fig. 1 I have shown only one section A of the harrow and have indicated, by showing a single rail thereof, the places for three more sections of the harrow, thus illustrating the method of use of four sections of the harrow in connection with the improved means shown for coupling the sections together flexibly and hauling them along.

In each section of the harrow a plurality of rails 1 is provided, which rails are preferably of wood and are advisably round or cylindrical in form, and each rail is also provided with a number of teeth 2, fixed therein by being inserted through the rail and advisably in such manner that the teeth in adjacent rails in the harrow-section alternate or do not register with each other in fore-and-aft lines. The several rails of the section are connected together at their respective ends, and for this purpose I provide a clip 3, conveniently constructed of malleable iron, constructed in curved form longitudinally, whereby it is adapted to fit on the upper surface of the rail 1, and is of a hollow rib or inverted substantially V shape in cross-section. The edges of the clip that are curved longitudinally are widened laterally, so as to provide increased bearing-surface fitting on the rail 1, as best illustrated in Fig. 3. This hollow-rib form of the clip secures the maximum of strength of material. Medially of this clip a longitudinal slot 4, Figs. 4 and 6, is provided, and a bolt 5, passing transversely through the rail 1, extends adjustably through the slot 4. The head of the bolt 5 is advisably at the bottom of the rail, and a washer 6 is placed between the head of the bolt and the rail, the washer being provided with a curved under surface that fits the surface of the rail. A locking-plate 7 is fitted revolubly on the bolt 5 under the nut 8 thereon, and this locking-plate 7 is provided with a laterally-projecting finger 9, that is adapted to enter the slot 4 at either end thereof when the plate 7 is turned to such end of the slot. The locking-plate 7 is also provided with two small fingers or lugs 10 on opposite sides thereof and at equal distances from the axis of the bolt 5 and at a less distance from the axis of the bolt than the finger 9, and these lugs are adapted also to come to and enter the slot 4 in the clip 3, the finger 9 in such case projecting laterally over the side of the clip. When the finger 9 enters the slot 4 at the rear end thereof, as shown in Fig. 2, the teeth 2 are held in upright position when the section is being hauled toward the front or in the direction of the extension of the longer end of the clip, and when the locking-plate 7 is reversed and the finger is turned toward the front or longer extension of the clip, as shown in Fig. 6, the teeth are thereby tilted somewhat in the direction shown in Fig. 6. In both these cases the lugs 10 lap over the sides of the clip 3, as indicated in the cross-section in Fig. 8. The locking-plate may also be so turned that the lugs 10 will enter the slot 4, one at each side of the bolt, thus adjusting and holding the bolt substantially at the middle of the slot, the finger 9 in such case projecting over the side of the clip. In these cases the adjustment is obtained by loosening the nut 8 and when the adjustment is made by turning the nut down to hold the parts in place.

At its respective ends the clip 3 is provided with longitudinally-extending hoods 11 12, the respective sides of each of which hoods being provided with a truncated boss, which bosses abut against each other, forming a concave or spool-shaped pivot 13, Fig. 7, engaged, respectively, by a link 14 and a link 15. The hoods 11 and 12 are so formed with reference to the pivots 13 that the swing of the links vertically on the pivot is in each case limited by the hood, which also prevents any play of the links laterally. It will also be noted that the positions of the hoods with reference to the axis of the curve of the clip 3 are different, or, in other words, that the surfaces of the hoods against which the links 14 and 15 are adapted to engage, respectively, are in different planes, permitting of different inclinations of the clip and the rail 1, secured thereto, with reference to the horizontal plane of draft of the harrow. It will also be noticed that the hood 11 is located at a somewhat greater distance from the slot 4 than the hood 12. By means of this peculiarity of the construction of the clips 3 in connection with the means for adjustment of the rails 1 revolubly in the clip 3 by means of the locking-plate 7 it will be seen that many different positions of the teeth of the harrow can be secured, varying from a vertical position to a considerable inclination therefrom, as shown in Fig. 6. The inclination of the teeth in the manner shown in Fig. 6 is secured and retained only when the harrow is hauled in the other direction from that shown in Fig. 1, or, in other words, when the means for hauling it along are attached to the sections at that end toward which the shorter prolongations of the clips 3 extend.

These harrows, as before stated, are manufactured in sections and are provided with means for combining or coupling them up, which combined sections and means for coupling them up are sold with and form a part of the complete harrow. The combined harrow, as shown in Fig. 1, consists of four sections, which are connected up to coupling-bars 16 in pairs, and these coupling-bars are connected together at their abutting ends by a union-bar 17, on which a swiveling bar 18 is pivoted medially, and draft-rods 19 20 are attached, respectively, to the coupling-bars 16 and to the swiveling bar 18 and are connected together by rings 21, to which the eveners or whiffletrees may be attached. When only two sections of the harrow are employed, one of the coupling-bars 16 will be omitted and also the union-bar 17 and the swiveling bar 18, and in such case the draft-rods 19 and 20 will be secured to the coupling-bar 16 by eyebolts inserted in the coupling-bar at 22 22. The union-bar 17 is connected to the coupling-bar 16 by straps 23, pivoted to the union-bar and to the coupling-bars. The sections A of the harrow are connected to the coupling-bars 16 by short chains or by a plurality of links 24 24, connecting the clips 3 to the coupling-bars, except that the clips 3 on the adjacent ends of rails of sections are connected to the links 24 by coupling devices, which consist of a plate 25, provided with an eye or eyes 26 at one extremity and at its other extremity having laterally-projecting trunnions 29 29, having annular grooves therein advisably semicircular in cross-section, one of these trunnions being provided with a guard 30, consisting of fingers projecting from the walls of the grooves and being bent over the grooves, coming together in such manner as to form a circular space for receiving the link 14, formed of a cylindrical wire or rod, therein.

The construction of the harrow while permitting all desired flexibility of the members secures the sections to each other and to their common means for draft in such manner that the sections will retain their proper positions with reference to each other, and the sections will be held against separating from each other or from being pushed against or onto each other by inequalities of the ground over which they are being hauled. Also because the links 15 cannot swing laterally the rails 1 keep constantly in the same relative positions to each other in such section, and the teeth always preserve their fixed alinement toward front and rear. The links 14 15 are preferably closed about their pivots at one end, so that they cannot be detached therefrom, and this is accomplished by bending the end of the link around the pivot into I form, while at the other end the link is left open or in the form of a hook, so that it can be readily detached from the connecting member. It should be understood that when the harrow is drawn along toward the front, as shown in Fig. 1, (the direction of the longer prolongation of the clips 3,) the teeth of the harrow, because of the pull on the links and the controlling capability of the clips, maintain vertical positions, as shown in Fig. 2, and that when the harrow is hauled in the other direction the same means acting differently permits the teeth to incline away from the direction of motion, and to this change in inclination of the teeth may be added that obtained by the shifting of the locking-plate 7 from the position shown in Fig. 2 to that shown in Fig. 6. Also it should be noted that the flexible joints in the sections of the harrows when the harrow is being hauled along in either direction are near to but just at the rear of each rail, the joints in front of the rails being by the strain on them held more stiffly in position. The construction is, however, such that the harrow has such flexibility that cornstalks or other usually clogging or obstructing material is permitted to escape from this harrow by the mere forward movement of the harrow without lifting the harrow or other applied assistance.

As in the arrangement of the teeth in the rails it so occurs that one tooth in each rail should be located at or very near the end of the rail, and as it is objectionable to extend the rail sufficiently to furnish a support for a tooth of the ordinary form passing transversely through the rail, I provide a tooth of the form shown in Fig. 8, in which the upper extremity of the tooth is bent over and extended laterally, providing a shank 31, which is adapted to be placed in a recess therefor in the top surface of the rail 1, and the shank is provided with a hole through which the bolt 5 is inserted, thereby securing the tooth to the rail. At the other side of the rail I provide a washer 32, having a laterally-projecting lug 33, provided with a hole through which the tooth 2 is inserted, thus providing means for holding the tooth securely in place on the rail 1. The washer 32, like the washers 6, fits about the bolt 5 under the head thereof and against the rail 1.

What I claim as my invention is—

1. In a harrow, a rail securing and connecting device comprising a clip provided with a terminal hood having a spool-shaped pivot for hinging a link therein and preventing play of the link laterally and limiting the swing of the link vertically.

2. In a harrow, an integral rail securing and connecting device comprising an elongated curved clip of hollow-rib form adapted to fit upon and to extend from side to side over a rail and having projecting means terminally for connecting links thereto.

3. In a harrow, a rail securing and connecting device comprising an elongated curved clip of hollow-rib form and provided medially with an elongated slot for receiving a bolt therethrough and permitting its adjustment therein.

4. In combination in a harrow, a tooth-holding rail, a clip in curved form fitting on the rail and provided with a longitudinal slot medially, a bolt fixed transversely in the rail and extending through the slot in the clip, a locking-plate loose on the bolt and having a finger adapted to enter said slot, and a nut turning on the bolt against the locking-plate.

5. In combination in a harrow, a tooth-holding rail, a clip in curved form fitting on and secured adjustably to the rail rotatively, hoods on and forming the extremities of the clip the hoods having means for holding therein pivotally and limiting the swing of links, and links connected to said clips in said hoods.

6. In combination in a harrow, a tooth-holding rail, a clip in curved form fitting on the rail rotatively said clip being provided medially with a slot, a bolt through the rail and projecting through the slot, a nut on the bolt, a locking-plate on the bolt under the nut adapted to hold the bolt against movement in the slot, and means in the ends of the clip for connecting links thereto and limiting the swing of the parts relative to each other.

In testimony whereof I affix my signature in presence of two witnesses.

GEORGE H. POUNDER.

Witnesses:
C. A. CASWELL,
B. G. TURNER.